Patented June 19, 1945

2,378,629

UNITED STATES PATENT OFFICE 2,378,629

COPOLYMERS OF MALEIC ANHYDRIDE

William E. Hanford, Wilmington, Del., assignor to E. I. du Pont de Nemours & Company, Wilmington, Del., a corporation of Delaware No Drawing. Application September 10, 1941, Serial No. 410,337

2 Claims. (Cl. 260—78)

This invention relates to polymeric materials and to their preparation.

It is known that polymers are obtained by interpolymerizing maleic anhydride, which does not polymerize alone, with readily polymerizable unsaturated compounds, namely, compounds containing an ethylenic double bond in which doubly bonded carbon is also attached to an electronegative atom or radical. The most important of these compounds are the vinyl and vinylidene compounds, including styrene, vinyl esters, vinyl ethers, vinyl halides, acrylonitrile, acrylic acid, methacrylic acid and esters. The interpolymers obtained contain a plurality of carboxylic acid anhydride groups and are generally difficultly soluble in aqueous alkaline solutions. They are solubized by digestion with hot aqueous alkali which brings about hydrolysis of the anhydride groups to yield carboxyl groups. These polymers are relatively expensive because of the high cost of the unsaturated acids or of the olefinic compounds heretofore known to interpolymerize with maleic anhydride.

It has also been proposed to use the olefins, which are polymerized alone only with considerable difficulty, in forming interpolymers with maleic anhydride by carrying out the reaction under pressure and at relatively high temperature either without a catalyst or with sodium or sodium amalgam as catalysts. The catalysts previously used are disadvantageous for several reasons. They are sensitive to oxygen, moisture, and acids and are insoluble in organic hydrocarbon solvents and are therefore more difficult to handle in a reaction of the type employed in the process of this invention. They must be removed from the reaction mixture after the reaction is over and are difficult to dispose of. Furthermore, sodium reacts to some extent with maleic anhydride on heating to yield colored products which have the added disadvantage of using up catalyst and at the same time introducing further undesirable by-products in the reaction. Ultra-violet light, which has also been suggested as a catalyst, has a decided disadvantage where closed vessels are to be used on a commercial scale.

The products as previously described consist of oily, alkali-insoluble and poorly characterized polymerization products together with a crystalline alkali-soluble product which is not polymeric in the sense of having multiply recurring structural units but is a substituted succinic anhydride formed by the addition of one molecule of the olefin to one molecule of the maleic anhydride. In the case of ethylene, I have not obtained appreciable reaction with maleic anhydride under any conditions except when using a peroxide catalyst. The products obtained from the higher olefins and maleic anhydride are found to consist chiefly of substituted succinic anhydride together with smaller amounts of polymer.

This invention has as an object an improved method for the preparation of alkali-soluble polymers from maleic anhydride and an olefinic compound. A further object is the production of a new polymer of this class. A still further object is a method for obtaining these polymers in high yield. Other objects will appear hereinafter.

The above objects are accomplished by the method described hereinafter in which the reaction between a mono-olefin having a terminal methylene group, and the maleic anhydride is carried out in the presence of a peroxide compound. The present invention is particularly advantageous in that high molecular weight polymers can be obtained easily in the above reaction with the terminally unsaturated lower olefins, that is, olefins containing four carbon atoms or less which are gases at ordinary temperatures and atmospheric pressure. Examples of these olefins are ethylene, propylene, isobutylene, and butene-1.

I have discovered that when the reaction between the maleic anhydride and an olefin of the above mentioned type is carried out in the presence of a peroxide catalyst, high molecular weight polymers, even in the case of the lower olefins including ethylene, can be obtained at low temperature and at a pressure not more than the autogeneous pressure of the reaction mixture, namely, at atmospheric or at the superatmospheric pressure obtained in a closed reaction vessel, and that the polymers obtained are in all instances alkali-soluble. Insofar as I am aware a polymerized product is not obtained in the prior processes in the case of a mixture of ethylene and maleic anhydride. The dimerization side reaction yielding the simple addition product of the olefin and the maleic anhydride is substantially eliminated by the present procedure. As indicated above, the present process is especially applicable to the simple olefins which do not otherwise interpolymerize easily with maleic anhydride but which are obtained at low cost from petroleum. These olefins include ethylene, propylene, isobutylene, and 2,4,4-trimethylpentene-1. The latter compound is the chief constituent of diisobutylene, obtained commercially from the dimerization of isobutylene.

It is to be observed that maleic acid is not the equivalent of the anhydride unless the reaction is carried out under conditions which will first convert the maleic acid to maleic anhydride since interpolymers are not otherwise obtained from maleic acid and olefins. Likewise it is to be observed that substituted maleic anhydrides, for example methyl maleic anhydride, apparently either do not interpolymerize with olefins or do so with difficulty.

As indicated above, the present process is operable at relatively low temperature which may be as low as 40° C. The temperatures used are preferably within the range of 70° to 150° C. although the process is not inoperative at higher temperatures. Superatmospheric pressure, although its use is not precluded, is not necessary in the present process to bring about interpolymerization of the olefins with maleic anhydride. With higher boiling olefins such as 2,4,4-trimethylpentene-1, the reaction is conveniently carried out in an open vessel which may be equipped with a reflux condenser. It may be, in fact, desirable to decrease the pressure by the use of an inert solvent such as xylene in the case of ethylene, propylene and isobutylene. It may be also desirable from the standpoint of convenience to carry out the reaction with these olefins in a closed vessel since they are gases even at room temperature.

The method for carrying out the invention is as follows: Maleic anhydride and the olefin are heated to about 100° C. and benzoyl peroxide catalyst is added. The polymerization is exothermic and proceeds rapidly but without violence. The reaction is usually carried out with equimolar quantities of reactants, but an excess of the olefin may often be used to advantage. Since the simple olefins are relatively immiscible with maleic anhydride it is preferred to add an inert solvent such as xylene in order to obtain a homogeneous reaction mixture.

In order to get the highest yield of polymer it is often particularly advantageous to add the benzoyl peroxide catalyst slowly to the reaction mixture throughout the polymerization period.

The interpolymers obtained are usually made up of approximately equimolar amounts of maleic anhydride and olefin. However, by using an excess of the olefin, considerably more than one mole may be introduced per mole of maleic anhydride. For instance, by using 4 moles of ethylene per mole of maleic anhydride a polymer containing 1.4 moles of ethylene for each mole of maleic anhydride is obtained. In Example VI below a polymer containing about 1.35 mols of ethylene for each mol of maleic anhydride is obtained by using about 4.6 mols of ethylene per mol of maleic anhydride.

The materials used in these polymerizations should be relatively dry to avoid hydrolysis of the maleic anhydride to maleic acid, but otherwise high purity is not necessary.

The following examples, in which the parts are by weight, are further illustrative of the practice of my invention.

*Example I*

Forty-five parts of diisobutylene and 40 parts of maleic anhydride are dissolved in 90 parts of xylene and the solution is heated to boiling under reflux. Three parts of benzoyl peroxide is added to bring about a rapid but smooth polymerization. At first there is vigorous ebullition (probably the diisobutylene) but as polymerization proceeds this ebullition stops and the temperature rises to 127° C. The reaction mixture is kept at this temperature for about 20 minutes. The product can be solubilized by adding water and sodium hydroxide, refluxing to effect hydrolysis. When a solution containing 10% of dissolved polymeric acid is adjusted to a pH of 5.2 and a temperature of 25° C. it has a viscosity of 6 centipoises as measured by a calibrated Dudley pipette, of the type mentioned in the Arthur H. Thomas Company 1931 catalog, page 594.

*Example II*

Seventy-five parts of diisobutylene and 49 parts of maleic anhydride are heated in a reaction vessel equipped with a suitable stirrer and reflux condenser until the diisobutylene boils. Two parts of benzoyl peroxide dissolved in 16 parts of xylene is then added dropwise to the reaction mixture over a period of 20 minutes and the reaction mixture is kept at its boiling point for an additional one-half hour. The product is isolated by hydrolyzing with aqueous sodium hydroxide solution and precipitating the aqueous salt solution obtained with hydrochloric acid. The yield of dry product amounts to 87 parts.

*Example III*

Forty-six parts of diisobutylene, 40 parts of maleic anhydride, 10 parts of styrene and 80 parts of xylene are heated to boiling and 2 parts of benzoyl peroxide is added slowly to the reaction mixture. The material is kept at its boiling point for 40 minutes. The product is isolated by hydrolyzing with aqueous caustic solution, separating the aqueous layer and precipitating the polymeric acid by acidification with hydrochloric acid. The yield of dried product amounts to 92 parts. The viscosity of a 10% aqueous solution of the polymer at pH 5.2 at 25° C. is 14 centipoises.

*Example IV*

Forty-nine parts of maleic anhydride, 52.5 parts of diisobutylene and 15 parts of xylene are heated to boiling with stirring. There is then added slowly a solution of 2 parts of benzoyl peroxide and 13 parts of styrene in 7 parts of xylene over a period of 20 minutes and the reaction is kept at its boiling point for an additional 25 minutes. The polymer is isolated by filtration and is purified by extraction with water. After drying, the yield of polymer amounts to 100 parts. The viscosity of a 10% aqueous solution of the polymer at pH 5.2 and 25° C. is 24 centipoises.

*Example V*

Two parts of maleic anhydride, 2 parts of allyl acetate, and 0.04 part of benzoyl peroxide are heated to 100° C. for 6 hours. The yield of glassy, brittle, alkali-soluble polymer is substantially quantitative.

*Example VI*

Thirty parts of maleic anhydride and 1.5 parts of benzoyl peroxide are dissolved in 170 parts of toluene and the solution is placed in an autoclave. Ethylene is admitted until the weight has increased by 40 parts. The reaction mixture in the autoclave is then heated. During the heating process an exothermic reaction occurs at about 100° C. and the temperature rises rapidly to about 150° C. The autoclave is heated at this temperature for an additional hour to complete the reaction. The toluene-insoluble product is isolated by filtration and amounts to 35 parts. Carbon-hydrogen analysis indicates that the interpolymer contains about 1.35 moles of ethylene for each mole of maleic anhydride. It dissolves quite readily in warm water and hydrolyzes slowly to the polycarboxylic acid. A 10% aqueous solu-solution of the polymer at pH 5.2 and 25° C. has a viscosity of 11.6 centipoises.

*Example VII*

Twelve hundred parts of maleic anhydride and 50 parts of benzoyl peroxide are dissolved in 6000 parts of xylene and the solution is placed in an autoclave equipped with a stirrer. This solution fills the autoclave to about two-thirds of its volume. Thirteen hundred fifty parts (4 mole equivalents) of ethylene is added and the autoclave is heated slowly. At about 80°–90° C., an exothermic reaction causes the temperature to rise rapidly to 125°–150° C. and heating is continued between these temperatures for an hour. The maximum pressure observed is 1000–1250 lbs./sq. in. After cooling the product is isolated by filtration and is freed from unreacted maleic anhydride by extraction with hot benzene. Analysis indicates that the interpolymer contains 1.4 moles of ethylene per mole of maleic anhydride. The yield is 1250 parts.

*Example VIII*

Forty-nine parts of maleic anhydride and 2 parts of benzoyl peroxide are dissolved in 85 parts of xylene and the solution is heated to 110° C. in a vessel equipped with a reflux condenser which is open to the atmosphere. Ethylene is bubbled into the solution, maintained at 90°–110° C. for 3 hours. An insoluble material gradually separates from the reaction mixture during this time. After cooling, the insoluble product is isolated by filtration and is washed with ether to remove any unreacted maleic anhydride. This polymeric product is shown by carbon-hydrogen analysis to be derived from approximately equimolar proportions of ethylene and maleic anhydride.

*Example IX*

Forty-nine parts of maleic anhydride and 1 part of benzoyl peroxide are dissolved in 85 parts of xylene and the solution is heated to 110° C. in a vessel equipped with a reflux condenser which is open to the atmosphere. Propylene is then bubbled into the solution. After an hour an additional part of benzoyl peroxide is added and at the end of 2 hours an additional one-half part of benzoyl peroxide is added. After 2½ hours, during which time a reddish brown insoluble oil settles from the reaction mixture, the propylene addition is stopped and the reaction mixture allowed to cool. The oily product solidifies on cooling and is isolated by filtration. It is washed with ether to remove unreacted maleic anhydride. The yield of polymeric product amounts to 10 parts. Its average molecular weight as determined by the boiling point rise method in acetone is 1530.

*Example X*

Thirty parts of maleic anhydride and 1.5 parts of benzoyl peroxide are dissolved in 170 parts of toluene and the solution is placed in an autoclave. Thirty-five parts of propylene is then added and the autoclave is heated. During the heating an exothermic reaction occurs at 100° C. and the temperature rises rapidly. The toluene-insoluble product is isolated by filtration and amounts to 38.6 parts. The polymer consists of equimolar amounts of interpolymerized propylene and maleic anhydride. The product is readily soluble in aqueous alkali but does not dissolve readily in hot water. A 10% solution at pH 5.2 and 25° C. has a viscosity of 12.5 centipoises.

*Example XI*

Thirty parts of maleic anhydride and 1.5 parts of benzoyl peroxide are dissolved in 170 parts of toluene in an autoclave and the whole system is cooled to −15° C. Twenty parts of liquid isobutylene is added and the autoclave is sealed and heated. During the heating process an exothermic reaction occurs in the interval from 100° to 140° C. The autoclave temperature is maintained at 140°–150° C. for an additional two hours. The white, toluene-insoluble, brittle product is isolated by filtration. The yield of dried product is quantitative.

The product dissolves readily in aqueous alkali to give a clear solution. A solution containing 10% of dissolved polymeric acid adjusted to a pH of 5.2 and a temperature of 25° C. has a viscosity of 23 centipoises as measured by the method of Example I.

Additional ethylenic compounds which may be used in the preparation of these interpolymers include 1-butene, 1-pentene, 1-hexene, and 3-methyl-butene-1.

Materials suitable for use as solvents should preferably boil at about 70° C. or above, be inert to maleic anhydride, and be readily freed from the product. Among such substances are benzene, toluene, xylene, dioxane, acetone, cyclohexane, saturated petroleum hydrocarbons, etc.

Any peroxide soluble in organic solvents may be used as a catalyst for the interpolymerization. Such peroxides include benzoyl peroxide, acetyl peroxide, butyryl peroxide, lauroyl peroxide, succinyl peroxide, ascaridole. Benzoyl peroxide, the preferred catalyst, is generally used in amounts ranging from 0.5 to 5 per cent.

The properties of the present polymers may be modified by including in the reaction various modifying agents or reactants. Particularly high molecular weight products may be obtained by adding to the polymerization mixture a polymerizable vinyl or vinylidene compound such as styrene or methyl methacrylate as a third component.

The polymers obtained by the practice of this invention are for the most part insoluble in water but are readily soluble in alkali. They are particularly useful as tanning agents, photographic chemicals, gelatin substitutes, agents for treating textile materials, petroleum chemicals, protein hardeners, alkyd resin ingredients, etc. The interpolymers of maleic anhydride with ethylene are especially valuable because of their relatively high solubility in water even without addition of alkali.

As many apparently widely different embodiments of this invention may be made without departing from the spirit and scope thereof, it is to be understood that I do not limit myself to the specific embodiments thereof except as defined in the appended claims.

I claim:
1. An alkali-soluble polymer which consists essentially of the interpolymerization product of maleic anhydride and ethylene, and which is the product obtained by heating a mixture of from 1 to about 4.6 mols of ethylene and with one mol of maleic anhydride to reaction temperature in contact with a peroxide catalyst and an inert diluent under a pressure not substantially greater than that resulting from the autogenous pressure of the reaction mixture.

2. A process for obtaining an alkali-soluble polymer consisting essentially of the interpolymerization product of maleic anhydride and ethylene, said process comprising heating a mixture of from 1 to about 4.6 mols of ethylene with one mol of maleic anhydride to reaction temperature in contact with a peroxide catalyst and an inert diluent under a pressure not substantially greater than that resulting from the autogenous pressure of the reaction mixture.

WILLIAM E. HANFORD.